US012586500B2

(12) United States Patent
Lee et al.

(10) Patent No.: US 12,586,500 B2
(45) Date of Patent: Mar. 24, 2026

(54) COMPENSATION CIRCUIT FOR STRETCHABLE DISPLAY AND STRETCHABLE DISPLAY INCLUDING SAME

(71) Applicant: SEOUL NATIONAL UNIVERSITY R&DB FOUNDATION, Seoul (KR)

(72) Inventors: Soo Yeon Lee, Seoul (KR); Ji Min Kang, Seoul (KR)

(73) Assignee: SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 215 days.

(21) Appl. No.: 18/695,048

(22) PCT Filed: Jul. 14, 2023

(86) PCT No.: PCT/KR2023/010150
§ 371 (c)(1),
(2) Date: Mar. 25, 2024

(87) PCT Pub. No.: WO2024/014931
PCT Pub. Date: Jan. 18, 2024

(65) Prior Publication Data
US 2025/0252880 A1 Aug. 7, 2025

(30) Foreign Application Priority Data

Jul. 14, 2022 (KR) ........................ 10-2022-0086923
Oct. 25, 2022 (KR) ........................ 10-2022-0137990

(51) Int. Cl.
G09G 3/00 (2006.01)
G06F 1/16 (2006.01)
G06F 3/044 (2006.01)
G09G 3/32 (2016.01)
G09G 3/3233 (2016.01)

(52) U.S. Cl.
CPC ........... *G09G 3/035* (2020.08); *G06F 1/1652* (2013.01); *G06F 3/0447* (2019.05); *G09G 3/32* (2013.01);
(Continued)

(58) Field of Classification Search
CPC ........... G09G 3/32–3291; G09G 3/035; G09G 2300/0842; G09G 2300/0852;
(Continued)

(56) References Cited

U.S. PATENT DOCUMENTS

| | | | | |
|---|---|---|---|---|
| 11,335,225 B2* | 5/2022 | Kim | ........................ | G09G 3/035 |
| 2021/0158734 A1* | 5/2021 | Kim | ........................ | H01L 25/162 |
| 2024/0428733 A1* | 12/2024 | Bae | ........................ | G09G 3/3266 |

FOREIGN PATENT DOCUMENTS

| | | |
|---|---|---|
| KR | 10-2016-0032294 A | 3/2016 |
| KR | 10-2017-0081076 A | 7/2017 |
| KR | 102009748 B1 * | 8/2019 |
| KR | 10-2020-0143627 A | 12/2020 |

(Continued)

OTHER PUBLICATIONS

Jimin Kang, et al., "AMOLED Pixel Circuit for Strain Compensation in Stretchable Display," SID Symposium Digest of Technical Papers, vol. 53, Issue 1, 2022, pp. 1063-1065.
(Continued)

*Primary Examiner* — Patrick F Marinelli
(74) *Attorney, Agent, or Firm* — Sughrue Mion, PLLC

(57) ABSTRACT

The present invention relates to a micro LED driving circuit comprising a double gate transistor, and comprises: a PWM circuit unit for adjusting the light emission time of a micro LED; and a CCG circuit unit for controlling, on the basis of PWM data voltage, that a certain current is supplied during light emission of the micro LED.

20 Claims, 13 Drawing Sheets

(52) U.S. Cl.
CPC ... $G09G\ 3/3233$ (2013.01); $G09G\ 2300/0819$ (2013.01); $G09G\ 2300/0852$ (2013.01); $G09G\ 2310/08$ (2013.01); $G09G\ 2320/0233$ (2013.01)

(58) Field of Classification Search
CPC ... G09G 2300/0861; G09G 2300/0819; G09G 2310/08; G09G 2320/0233; G06F 1/1652; G09F 9/301
See application file for complete search history.

(56) References Cited

FOREIGN PATENT DOCUMENTS

| KR | 10-2021-0083151 A | 7/2021 |
| WO | 2017/094604 A1 | 6/2017 |

OTHER PUBLICATIONS

Jimin Kang, et al., "Stretchable AMOLED Display Pixel Circuit Compensating for $V_{th}$ Variation and Strain Effect," The 29th International Workshop on Active-Matrix Flatpanel Displays and Devices-TFT Technologies and FPD Materials-, 2022, pp. 160-163.
Jimin Kang, et al., "A New Pixel Circuit Compensating for Strain-Induced Luminance Reduction in Stretchable Active-Matrix Organic Light Emitting Diode Displays," IEEE Electron Device Letters, vol. 42, No. 9, 2021, pp. 1350-1353.
Korean Office Action for KR 10-2022-0137990 dated Oct. 20, 2023.
International Search Report for PCT/KR2023/010150 dated Oct. 11, 2023.

* cited by examiner

【FIG. 1】
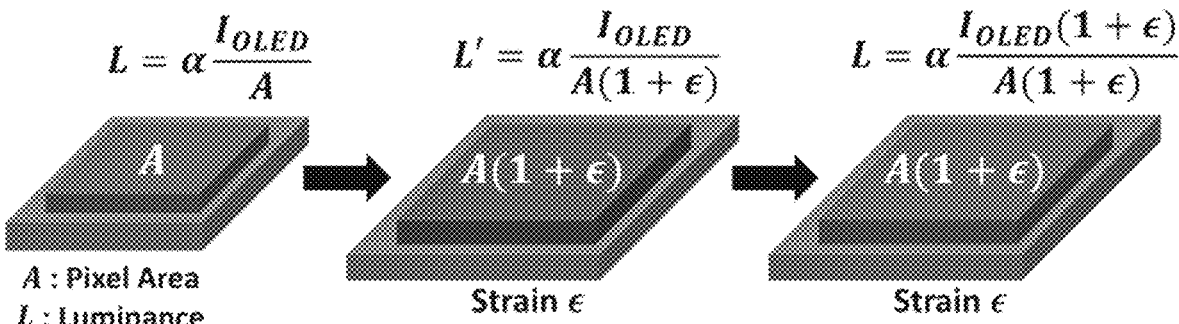
$$L = \alpha \frac{I_{OLED}}{A} \qquad L' = \alpha \frac{I_{OLED}}{A(1+\epsilon)} \qquad L = \alpha \frac{I_{OLED}(1+\epsilon)}{A(1+\epsilon)}$$
$A$ : Pixel Area
$L$ : Luminance
Strain $\epsilon$         Strain $\epsilon$
【FIG. 2】
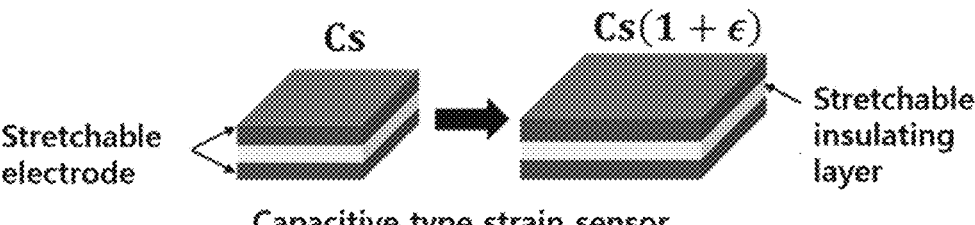
$Cs$         $Cs(1+\epsilon)$
Stretchable
electrode
Stretchable
insulating
layer
Capacitive type strain sensor 【FIG. 3】
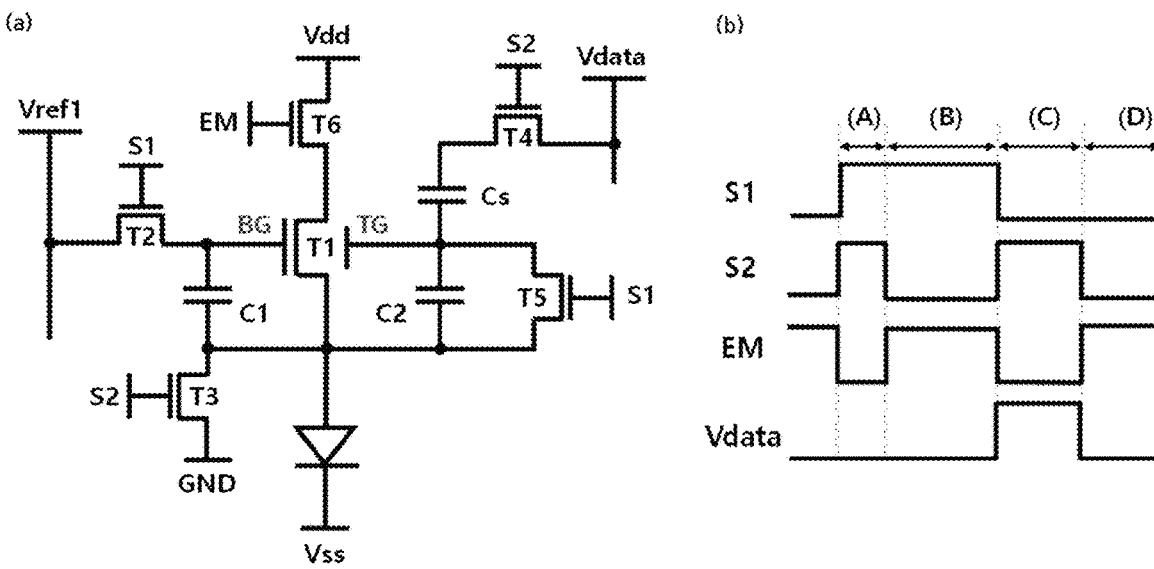
【FIG. 4】
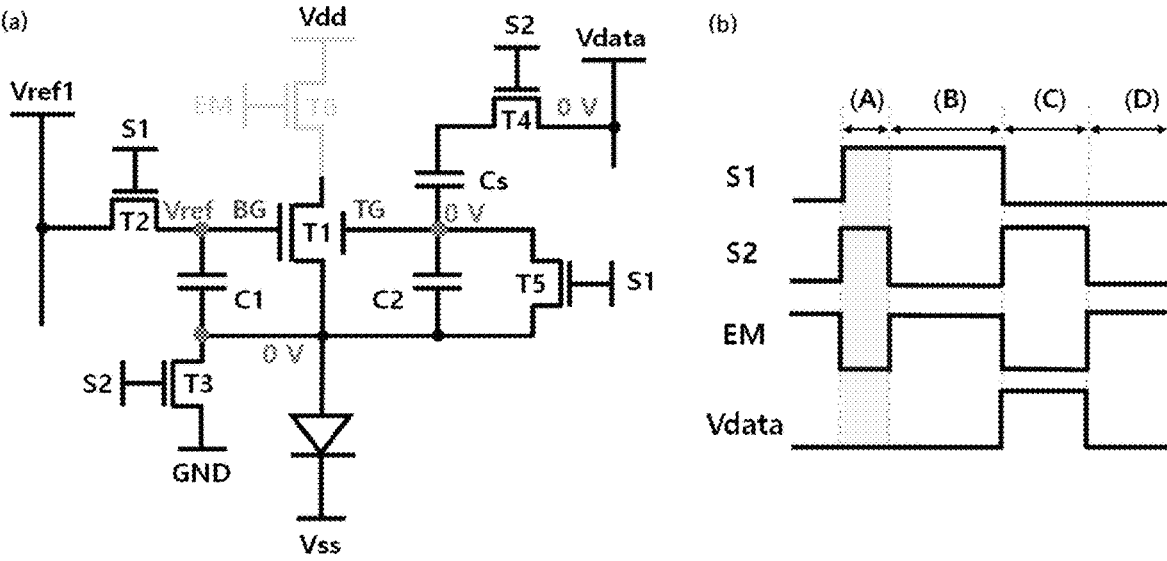

【FIG. 5】
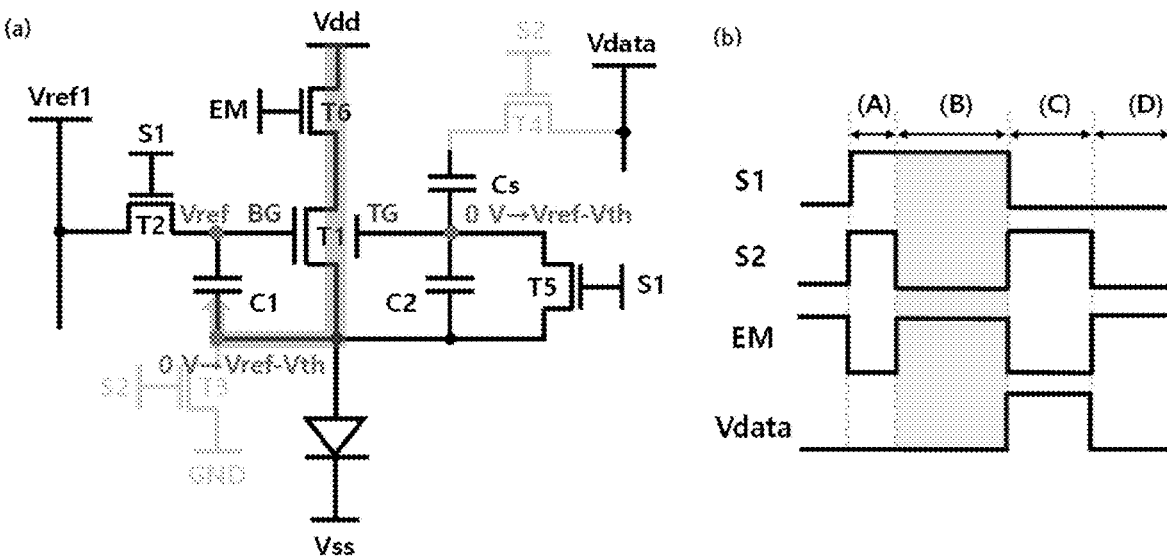
【FIG. 6】
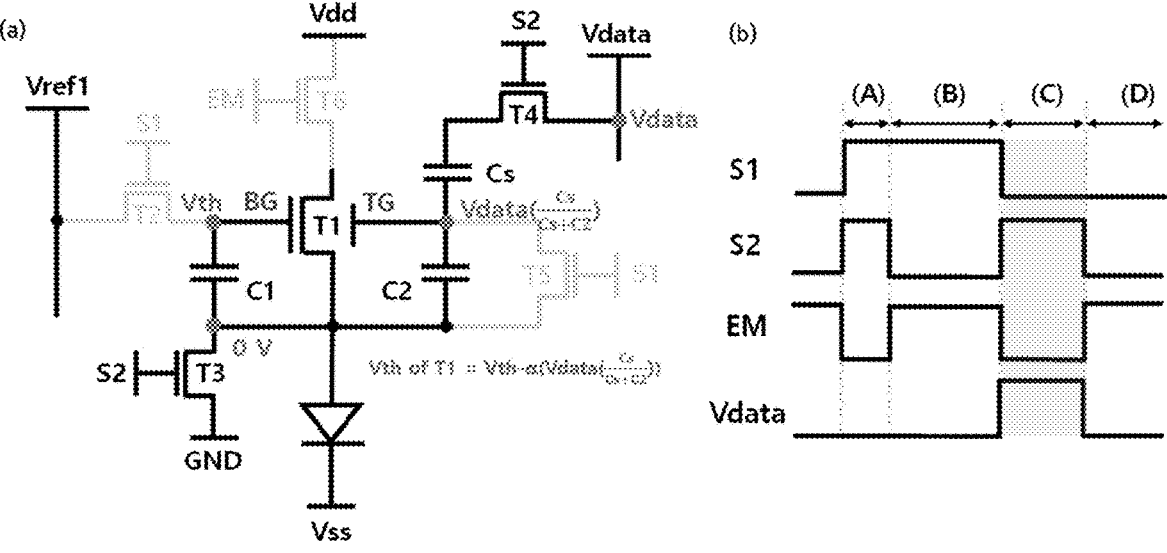

【FIG. 7】
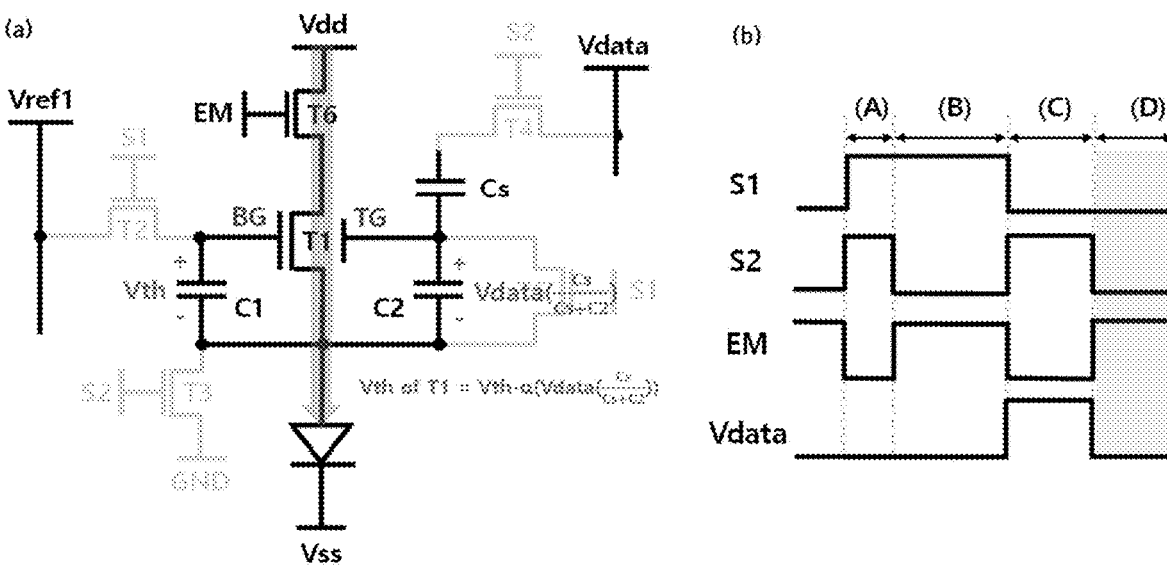
【FIG. 8】
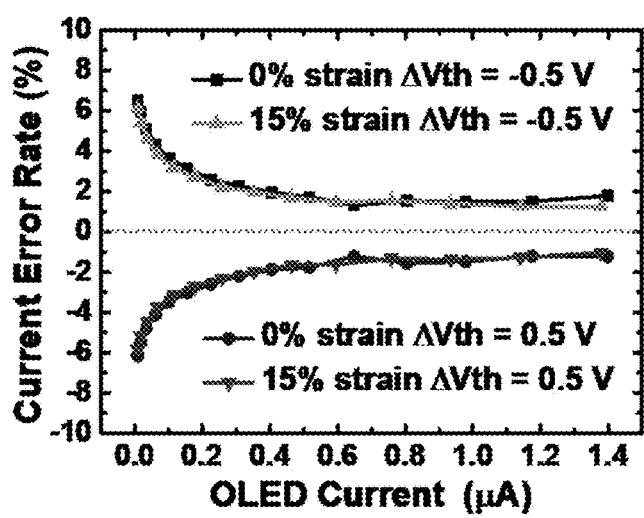

【FIG. 9】
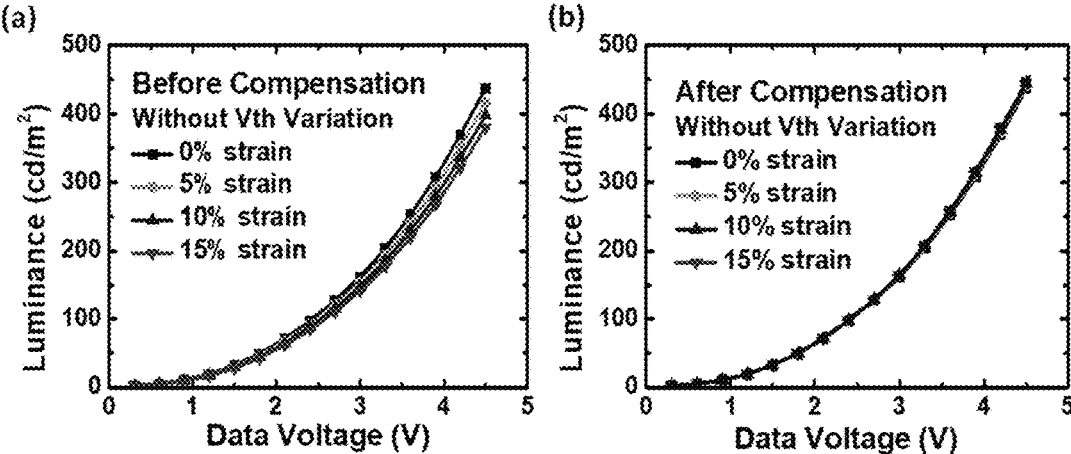
【FIG. 10】
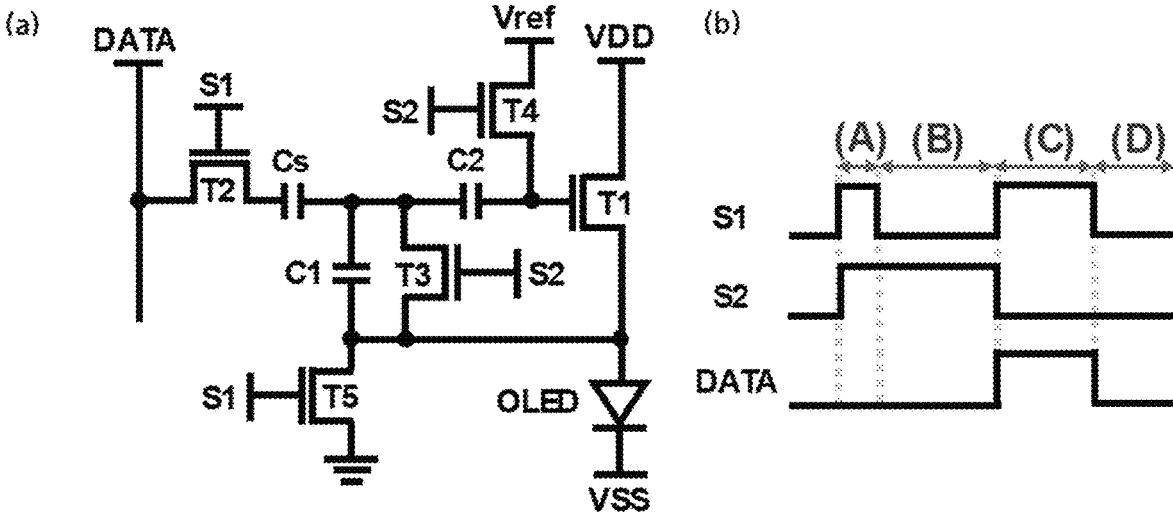

【FIG. 11】
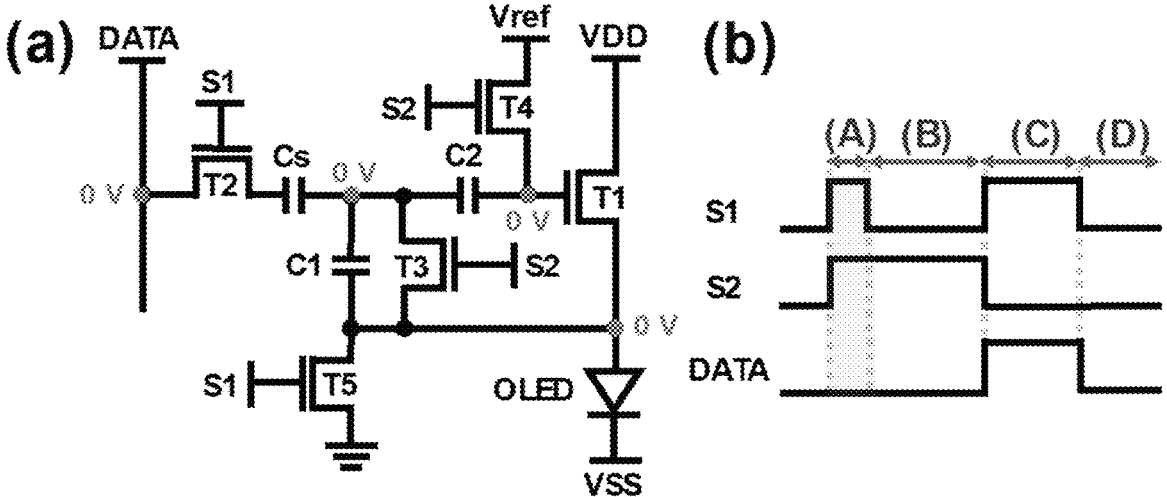
【FIG. 12】
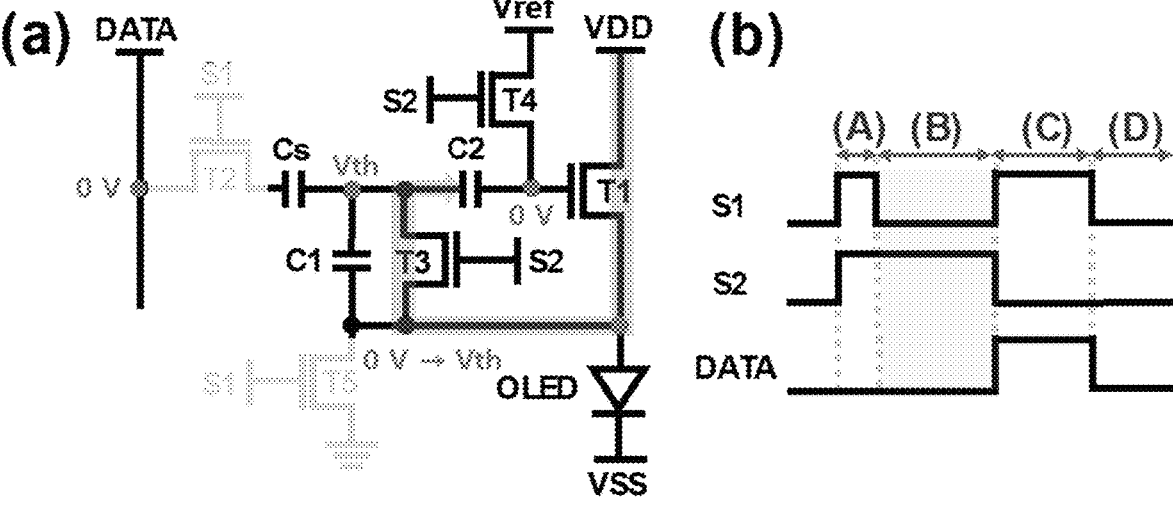

【FIG. 13】
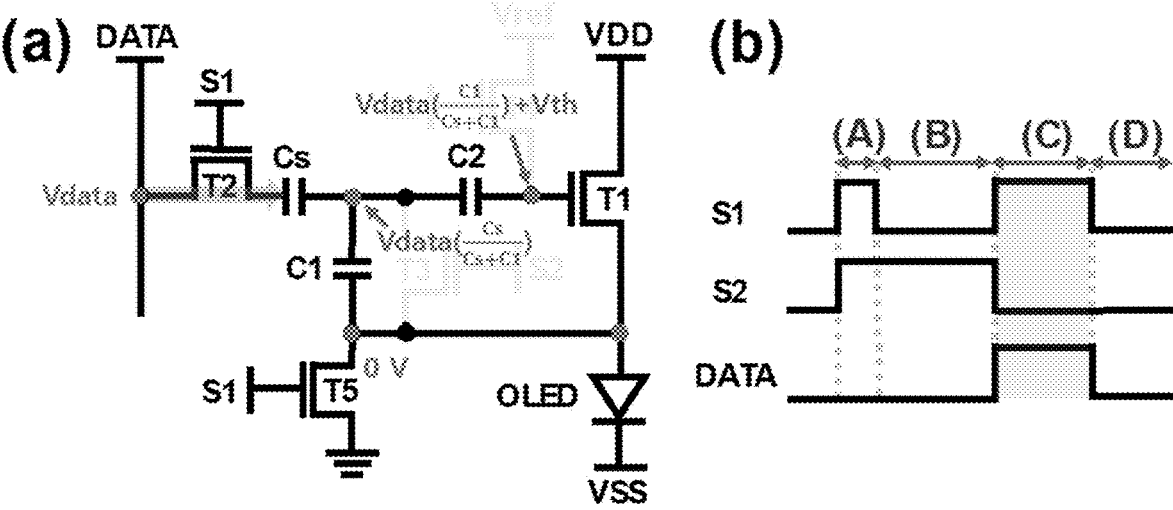
【FIG. 14】
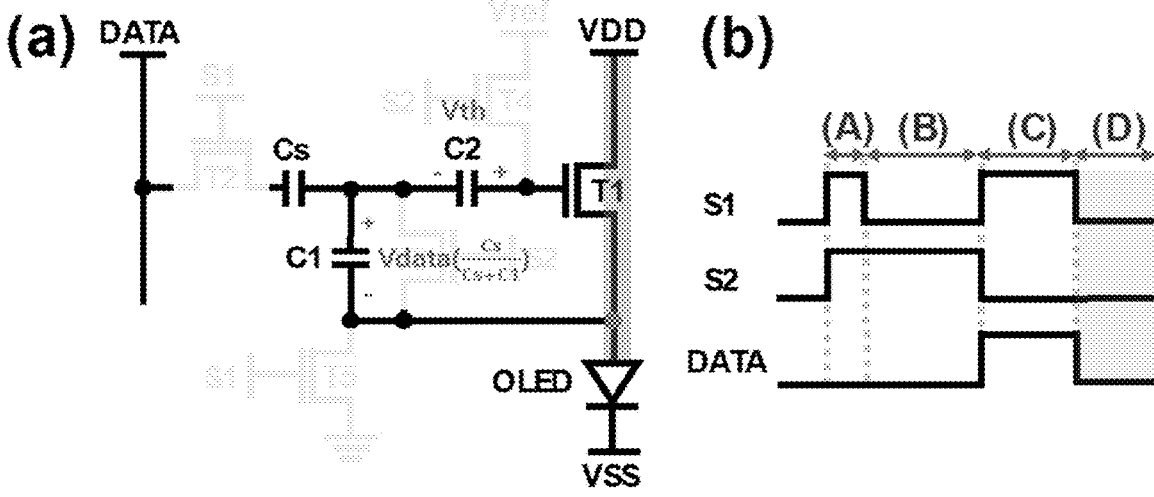

【FIG. 15】
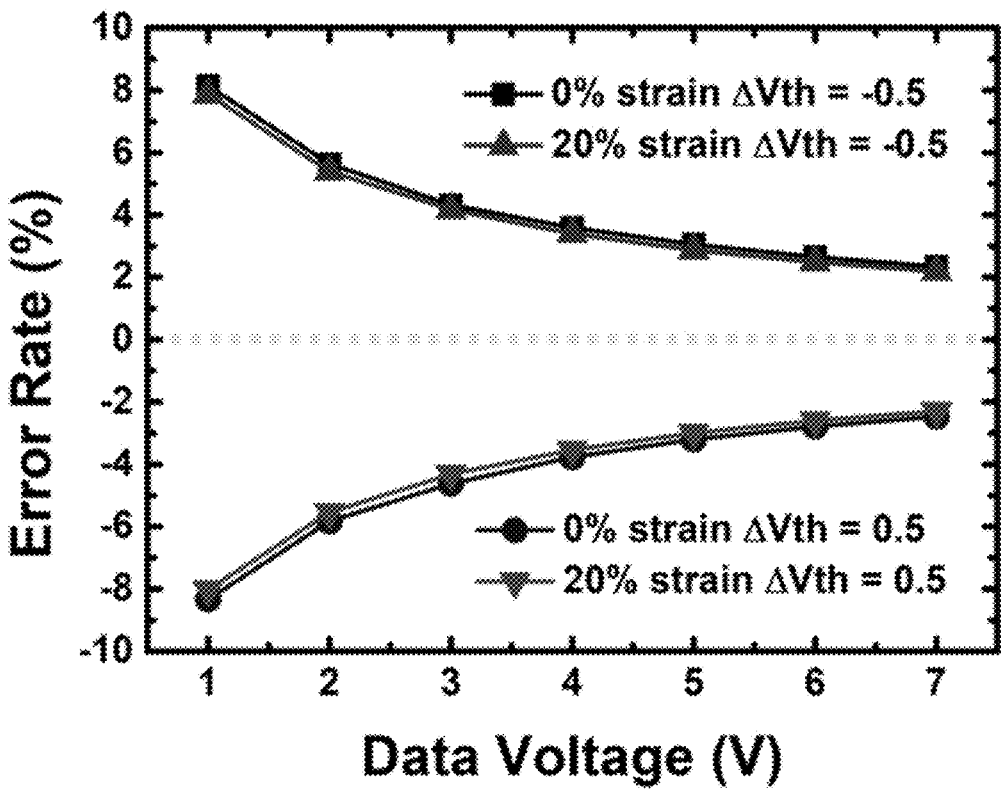
【FIG. 16】
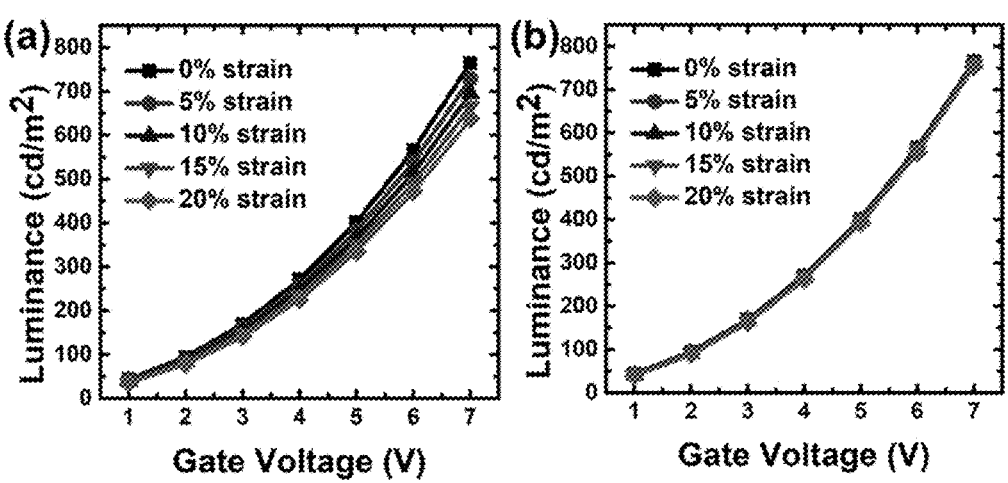

【FIG. 17】
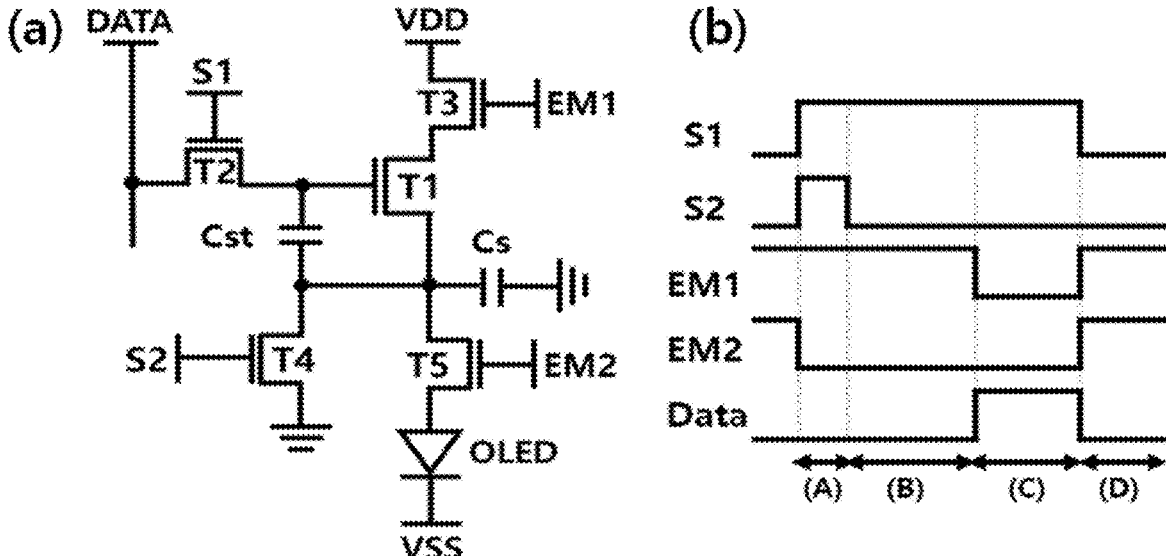
【FIG. 18】
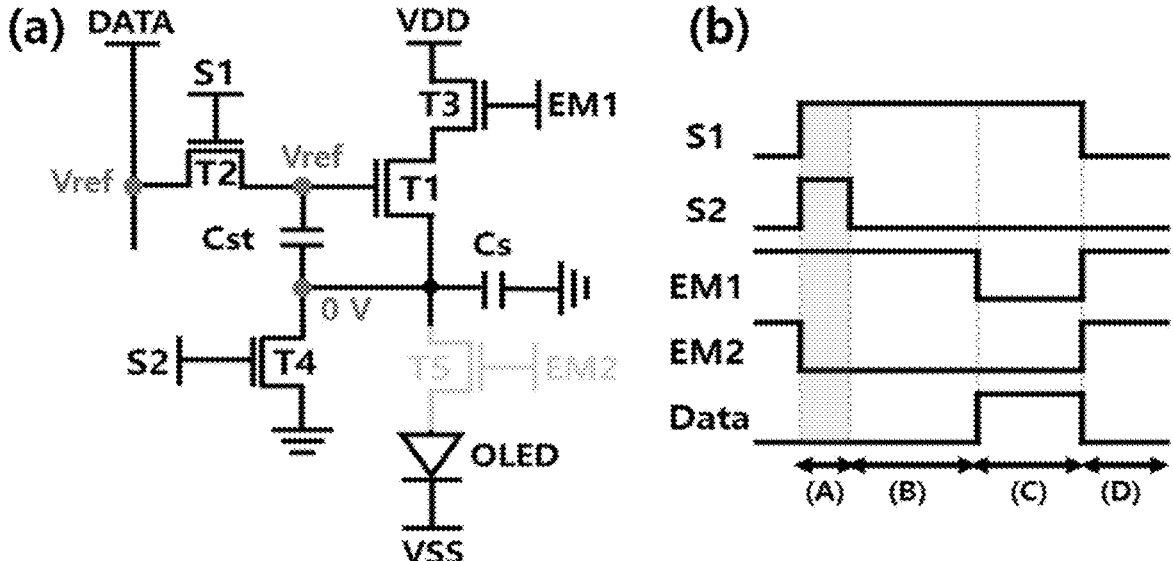

【FIG. 19】
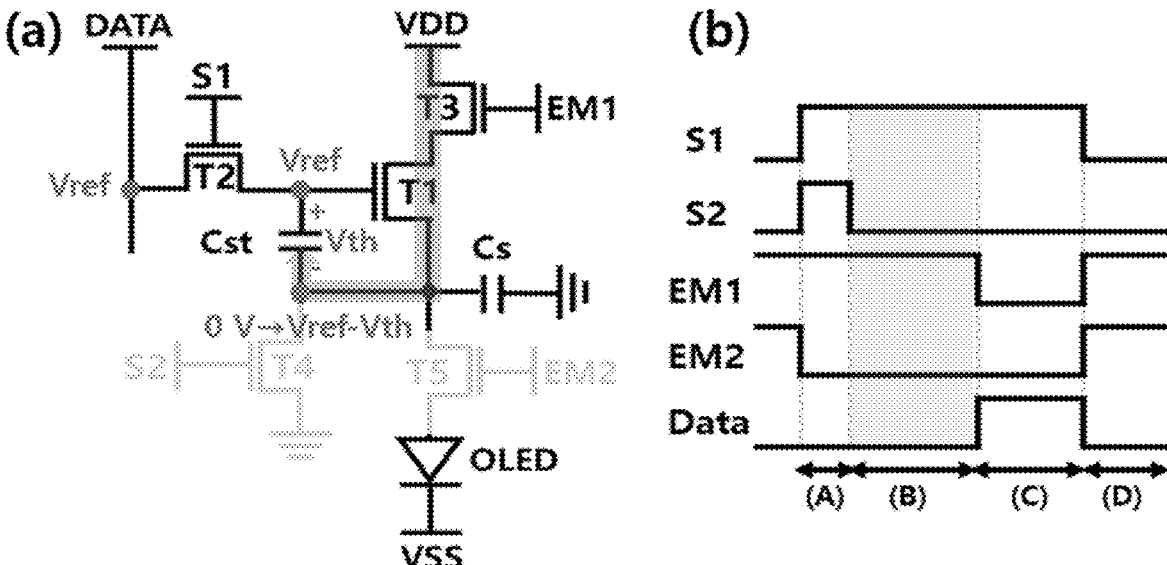
【FIG. 20】
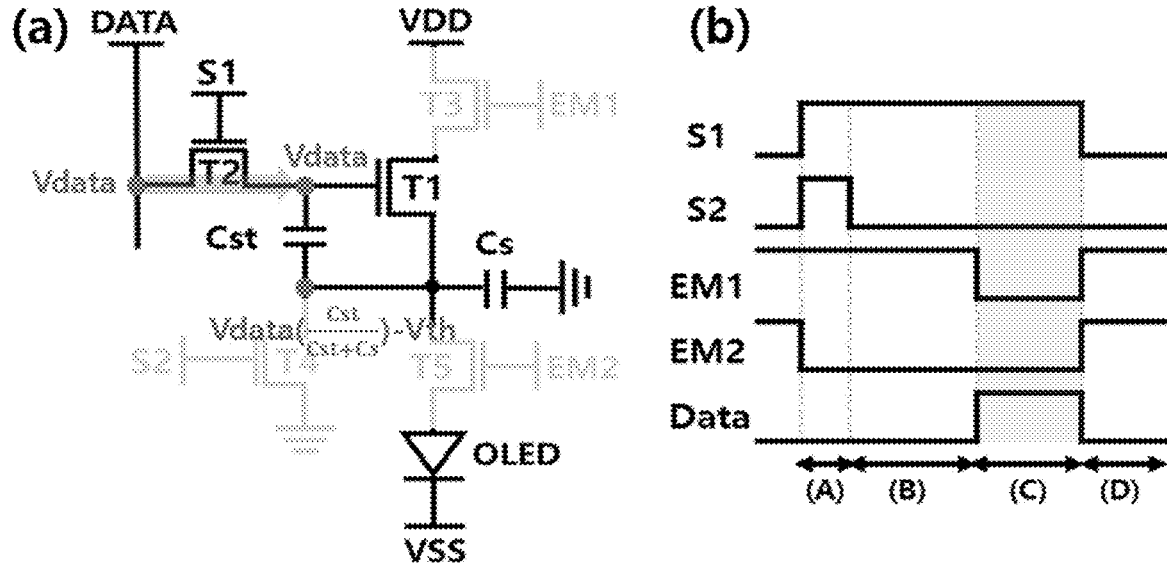

【FIG. 21】
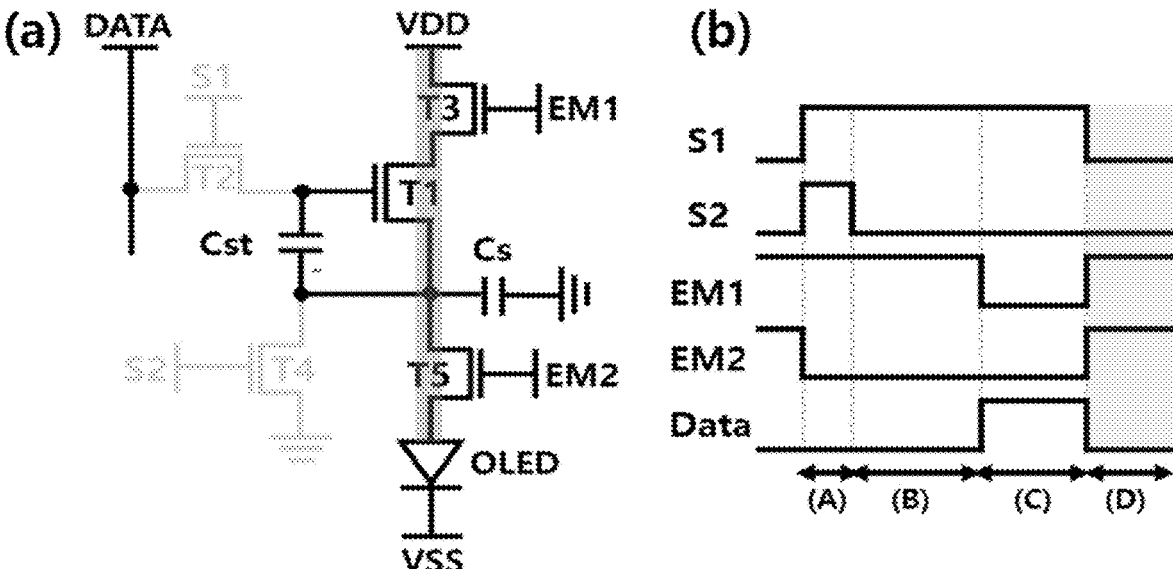
【FIG. 22】
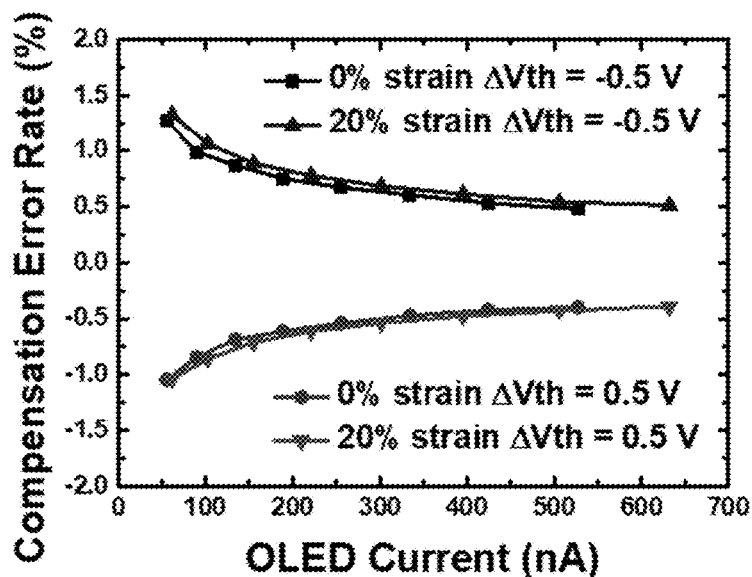

【FIG. 23】
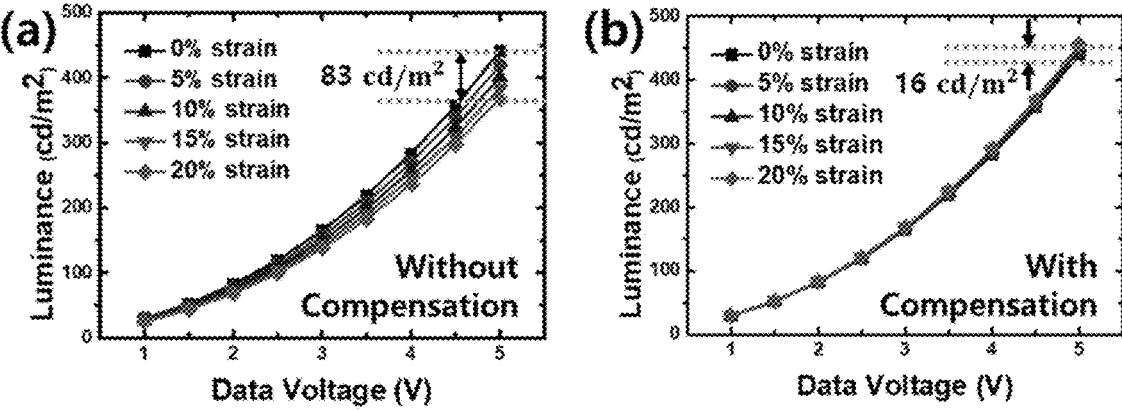

COMPENSATION CIRCUIT FOR STRETCHABLE DISPLAY AND STRETCHABLE DISPLAY INCLUDING SAME

CROSS REFERENCE TO RELATED APPLICATIONS

This application is a National Stage of International Application No. PCT/KR2023/010150 filed Jul. 14, 2023, claiming priority based on Korean Patent Application No. 10-2022-0086923 filed Jul. 14, 2022 and Korean Patent Application No. 10-2022-0137990 filed Oct. 25, 2022, the entire disclosures of which are incorporated herein by reference.

TECHNICAL FIELD

The present invention relates to a circuit applicable to a stretchable display, and more specifically, it relates to a circuit for controlling driving a light emitting device of a stretchable display and a display to which the display is applied.

BACKGROUND ART

In recent years, interest in stretchable displays equipped with a stretchable display panel which has stretchability and elasticity and therefore its size (i.e., area) can be varied has been increasing.

However, in the stretchable displays, when the size of the display panel changes based on stretchability and elasticity, the area of pixels equipped in the stretchable display panel changes and the brightness of the display decreases.

In addition, changes in characteristics (for example, changes in threshold voltage, changes in mobility, etc.) may be caused in thin film transistors inside pixels. As a result, in the stretchable displays, when the size of the stretchable display panel changes, changes occur in currents flowing inside the pixels, causing luminance unevenness in the stretchable display panel.

Therefore, a circuit configuration which can compensate for luminance reduced when the screen is expanded and the area becomes broader than before in a display substate using flexible or stretchable materials is required.

In other words, in the case of the stretchable displays, when the area increases, the luminance decreases, and there is a situation where a circuit configuration which can compensate for this is required for even luminance, but there is a situation where a circuit that can solve this problem with a simply commercially available structure is not still derived.

DISCLOSURE

Technical Problem

An object of the present invention is to suggest a configuration of a circuit which can compensate the luminance of a light emitting device during stretching driving of a display in a simple manner to solve the afore-mentioned problems, and at the same time, is to present a circuit which can even compensate for the threshold voltage of a driving TFT.

The present invention has been developed for the purpose of advancing commercialization of a stretchable display, by presenting a technology to circuitly compensate for changing pixels of a light emitting device in line with development of materials of the stretchable display or a device structure.

Technical Solution

The compensation circuit for a stretchable display suggested according to one example of the present invention can compensate for changes in luminance occurring in a stretching process of the display by controlling currents flowing through the light emitting device using a strain sensor, in the compensation circuit for a stretchable display comprising a light emitting device.

According to one example, the strain sensor may be a capacitive type, and may be a sandwich structure equipped with a flexible insulating film between two electrodes.

The capacity of the strain sensor may increase in direct proportion to the applied strain.

According to one example, the compensation circuit may comprise a circuit which can compensate for threshold voltage of a driving TFT, and may comprise each at least one storage capacitor, driving TFT and switching TFT.

According to one example, the compensation circuit may comprise a threshold voltage compensation unit comprising a circuit for compensating for changes in threshold voltage of a driving TFT; and a luminance reduction compensation unit comprising a circuit for compensating for reduction in luminance of the display.

According to one example, the driving TFT may be a double gate structure.

According to one example, the threshold voltage compensation unit may comprise a first storage capacitor for storing threshold voltage of the driving TFT; and a plurality of switching TFTs which are connected in series with the first storage capacitor and are for initializing and controlling voltage of each node.

According to one example, the luminance reduction compensation unit may comprise a structure in which the strain sensor is connected in series with one storage capacitor, and a node between the strain sensor and the storage capacitor may be connected with a gate of the driving TFT.

According to one example, the luminance reduction compensation unit may further comprise a plurality of switching TFTs for initializing and controlling voltage of each node.

According to one example, the circuit of the threshold voltage compensation unit for compensating for changes in threshold voltage of the driving TFT and the circuit of the luminance reduction compensation unit for compensating for reduction of luminance of the display may be not separately divided and separated.

According to one example, the storage capacitor may perform threshold voltage storage and luminance reduction compensation simultaneously.

According to one example, the compensation circuit may comprise at least one emission TFT which blocks current from flowing to the light emitting device during compensation of changes in luminance, and at least one of the emission TFTs may be connected between the driving TFT and the light emitting device.

The method for compensating for luminance of a stretchable display using a compensation circuit suggested according to another example of the present invention, comprises a node voltage initialization step, in which voltages applied to each node are initialized; a threshold voltage compensation step, in which threshold voltage of a driving TFT is stored in a storage capacitor of a threshold voltage compensation unit; a data voltage application step, in which data voltage is stored in the storage capacitor; and a light emitting device emission step, in which capacitive coupling occurs between a strain sensor and the storage capacitor and compensation for luminance reduction is performed and a light emitting device emits light, when stretching of a display occurs.

According to one example, the compensation for luminance reduction may be performed using the compensation circuit suggested according to one example of the present invention described above.

The stretchable display comprising a luminance compensation circuit suggested according to other one example of the present invention, comprises a compensation circuit which can compensate for changes in luminance occurring in a stretching process of the display by controlling current flowing through the light emitting device using a strain sensor, wherein the strain sensor is a capacitive type in which the capacity is in direct proportion to the strain, and is a sandwich structure equipped with a flexible insulating film between two electrodes, and the compensation circuit comprises a threshold voltage compensation unit comprising a circuit for compensating for changes in threshold voltage of a driving TFT; and a luminance reduction compensation unit comprising a circuit for compensating for reduction of luminance of the display, in a stretchable display comprising a luminance compensation circuit

Advantageous Effects

When the compensation circuit suggested in the present invention is used, there is an effect which can automatically compensate for reduction of luminance during stretching deformation of a stretchable display without many components through a simple and clear circuit. In addition, there is an advantage capable of compensating for not only luminance reduction but also threshold voltage of a driving TFT simultaneously.

Using this compensation circuit, commercialization of a stretchable display can be contributed and expansion of various future display applications can be promoted.

BRIEF DESCRIPTION OF THE DRAWINGS

FIG. 1, conceptually shows the principle by which luminance of a panel comprising a light emitting device is deformed (reduced) as stretching deformation occurs in a stretchable display, and the appearance in which the luminance remains the same as before stretching deformation occurs, as the luminance is compensated through the compensation circuit suggested in the present invention.

FIG. 2, is a schematic diagram showing one embodiment of the strain sensor comprised as one of important components in the compensation circuit according to one example of the present invention.

FIG. 3, is a circuit diagram for describing the first compensation circuit suggested as one example in the compensation circuit according to one example of the present invention and a signal waveform diagram for driving the first compensation circuit.

FIG. 4 to FIG. 7, sequentially show the principles of each step in which the first compensation circuit suggested as one example in the compensation circuit according to one example of the present invention is driven, and are circuit diagrams and signal waveform diagrams showing circuit driving of the node voltage initialization step, threshold voltage compensation step, data voltage application step, and light emitting device emission step, respectively.

FIG. 8, is a graph showing the result of the threshold voltage compensation simulation of the first compensation circuit suggested as one example in the compensation circuit according to one example of the present invention.

FIG. 9, is a graph showing the result of the luminance reduction compensation simulation according to display stretching of the first compensation circuit suggested as one example in the compensation circuit according to one example of the present invention.

FIG. 10, is a circuit diagram for describing the second compensation circuit suggested as another example in the compensation circuit according to one example of the present invention, and a signal waveform diagram for driving the second compensation circuit.

FIG. 11 to FIG. 14, sequentially show the principles of each step in which the second compensation circuit suggested as another example in the compensation circuit according to one example of the present invention is driven, and are circuit diagrams and signal waveform diagrams showing circuit driving of the node voltage initialization step, threshold voltage compensation step, data voltage application step, and light emitting device emission step, respectively.

FIG. 15, a graph showing the result of the threshold voltage compensation simulation of the second compensation circuit suggested as one example in the compensation circuit according to one example of the present invention.

FIG. 16, is a graph showing the result of the luminance reduction compensation simulation according to display stretching of the second compensation circuit suggested as one example in the compensation circuit according to one example of the present invention.

FIG. 17, is a circuit diagram for describing the third compensation circuit suggested as other example in the compensation circuit according to one example of the present invention and a signal waveform diagram for driving the third compensation circuit.

FIG. 18 to FIG. 21, sequentially show the principles of each step in which the third compensation circuit suggested as other example in the compensation circuit according to one example of the present invention is driven, and are circuit diagrams and signal waveform diagrams showing circuit driving of the node voltage initialization step, threshold voltage compensation step, data voltage application step, and light emitting device emission step, respectively.

FIG. 22, a graph showing the result of the threshold voltage compensation simulation of the third compensation circuit suggested as one example in the compensation circuit according to one example of the present invention.

FIG. 23, is a graph showing the result of the luminance reduction compensation simulation according to display stretching of the third compensation circuit suggested as one example in the compensation circuit according to one example of the present invention.

MODE FOR INVENTION

Figure 24:
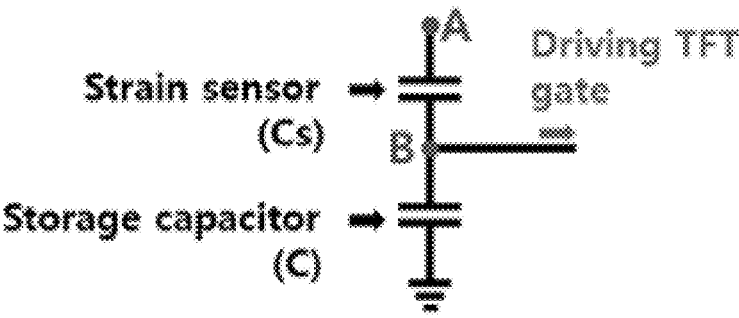
FIG. 24 shows a structure in which a strain sensor (Cs) and a storage capacitor (C) are connected in series. Then, nodes between the sensor and storage capacitor may be connected with a driving TFT gate.

Examples of the present invention are illustrated for the purpose of describing the technical spirit of the present invention. The scope according to the present invention is not limited to examples or detailed description for these examples presented below.

All technical terms and scientific terms used in the present invention, unless otherwise defined, have meanings commonly understood by those skilled in the art to which the present invention pertains. All terms used in the present invention are selected for the purpose to more clearly describe the present invention, and are not selected to limit the scope according to the present invention.

Expressions such as "comprising", "with", "having" and the like used in the present invention, unless otherwise stated in the phrase or sentence comprising the corresponding expression, should be understood as open-ended terms containing possibility to include other examples.

Expressions of the singular form described in the present invention may include a meaning of the plural form unless otherwise mentioned, and this is applied to expressions of the singular form described in the claims in the same manner.

Hereinafter, with reference to the accompanied drawings, the examples of the present invention will be described. In addition, in the description of the following examples, describing the same or corresponding elements repeatedly may be omitted. However, even if the description for the elements is omitted, it is not intended to be that such elements are not included in any example.

The technology to be suggested in the present invention relates to a stretchable display. The stretchable display is a term referring to a display form that is free to change shape and form, and is used to refer to a display that is capable of ultimate deformation beyond foldable, flexible, and rollable displays, and is attracting attention as a form factor that will lead the next-generation display market.

In order for the stretchable display to be implemented effectively, despite deformation of the shape and form of the display, it is necessary to deliver a uniformly displayed image to a user. Therefore, suggestion of a new technology that can solve such technical needs has recently got settled in researchers as one key goal to achieve commercialization of the stretchable display.

Such a technical goal is described in more detail with reference to FIG. 1 as follows.

FIG. 1, conceptually shows the principle by which luminance of a panel comprising a light emitting device is deformed (reduced) as stretching deformation occurs in a stretchable display, and the appearance in which the luminance remains the same as before stretching deformation occurs, as the luminance is compensated through the compensation circuit suggested in the present invention.

The left drawing of FIG. 1 is a drawing which shows the panel before stretching occurs, and the middle drawing is a drawing that the brightness is reduced due to an increase in the area of the display when stretching occurs but there is no luminance compensation, and the right drawing shows that the luminance remains the same as the situation before stretching occurs, even though the area of the display has increased by applying the compensation circuit.

The brightness (L) of the display is generally shown as inversely proportional to the display area (A) and proportional to the current (I) of the light emitting diode.

$$L = \alpha I / A$$

Then, if the display is stretched by an external strain (s), the area of the display increases (A(1+ε)), and thus, a problem that the overall luminance is reduced (L/(1+ε)) occurs.

$$L/((1 + \varepsilon)) = \alpha I/(A(1 + \varepsilon))$$

Regarding this problem, a technical solution that can maintain the display luminance the same as before stretching can be derived by increasing the current (I) of the light emitting diode by (1+ε) times.

$$L = \alpha(I(1 + \varepsilon))/(A(1 + \varepsilon))$$

The technical principle applied in the present invention to compensate for (compensation) such luminance reduction is as follows.

The circuit uses a method of increasing the current (I) flowing through the light emitting device (diode) by (1+ε) times to compensate for changes in luminance by stretching of the stretchable display, and the current (I) flowing through the light emitting device may be adjusted by the gate voltage of the driving TFT (Thin-Film Transistor). For increasing the current (I) flowing through the light emitting device by (1+ε) times, the gate voltage of the driving TFT should be increased by $$\left(1 + \frac{\varepsilon}{2}\right)$$

times.

For this, the present inventors have introduced a structure in which a strain sensor (Cs) and a storage capacitor (C) are connected in series in some examples. Then, nodes between the sensor and storage capacitor may be connected with a driving TFT gate. See FIG. 24.

To explain the above circuit as an example, when voltage Vdata is applied to node A when no strain is applied, the voltage of node B becomes Vdata*Cs/(Cs+C) by coupling. Then, when a strain is applied from the outside, as the capacitance of the strain sensor changes, the voltage of node B increases by Vdata*Cs/(Cs+C)(1+ε/2). Since the node B is connected to the gate of the driving TFT, the effect that the current (I) flowing through the light emitting diode increases by (1+ε) times finally occurs.

The present inventors have confirmed that such a technical solution can be achieved by a simpler and more effective method compared to conventional methods by introducing the circuit structure into the compensation circuit, thereby completing the present invention.

FIG. 2, is a schematic diagram showing one embodiment of the strain sensor comprised as one of important components in the compensation circuit according to one example of the present invention.

In the present invention, the strain sensor refers to a sensor that detects the degree of deformation and stretching through the capacitance change of the sensor. The strain sensor may have characteristics that the capacitance of the sensor increases in proportion to the strain as the area of the sensor increases when the strain (ε) is applied from the outside. In other words, when the capacitance of the strain sensor is Cs in the initial state, the characteristic that the capacitance increases to Cs(1+ε) when the strain (ε) is applied may be shown.

In one embodiment, the strain sensor may have a structure in which two stretchable conductive plates (electrodes) are positioned side by side, and a stretchable insulator is inserted between them.

Hereinafter, referring to FIG. 3 to FIG. 23, each example of the circuit suggested by the present inventors will be described in detail. Three kinds of examples to be described below are only each example of the circuit which can compensate for luminance of a stretchable display by introducing a strain sensor, and the spirit of the present invention is not necessarily limited to the three kinds of circuits to be described below.

Hereinafter, the circuits to be suggested in the examples will conduct not only luminance reduction compensation but also threshold voltage compensation of a driving TFT. The threshold voltage compensation has been necessarily conducted together to solve an image non-uniformity problem in conventional flat panel displays, but according to the example of the present invention may handle the threshold voltage compensation in the luminance compensation circuit together without needs of introduction of a separate circuit.

The circuits to be suggested in the following examples may form one distinct section divided into components for threshold voltage compensation and components for luminance reduction compensation, and in some circuits, the components for threshold voltage compensation and components for luminance reduction compensation may be hybridized, so sections distinguishable from each other may be not formed.

In the following examples, the essential components for luminance reduction compensation include a driving TFT, a strain sensor, and a capacitive capacitor, and in addition, a separate capacitive capacitor for threshold voltage compensation, and switching TFTs and emission TFTs used for initializing and adjusting node voltage are present.

The circuit may be driven in the order of (1) a node voltage initialization step; (2) a threshold voltage compensation step; (3) a data voltage application step; and (4) a light emitting device emission step for one period when an image is updated. The threshold voltage compensation in the (2) threshold voltage compensation step, and the luminance reduction compensation in the (4) light emitting device emission step, may be conducted in real time whenever stretching occurs.

The compensation circuit of a stretchable display suggested according to one example of the present invention, is a compensation circuit for a stretchable display comprising a light emitting device, which can compensate for luminance changes occurring in a stretching process of the display by controlling currents flowing through the light emitting device using a strain sensor.

The compensation of the luminance changes may be performed in real time.

According to one example, the strain sensor may be a capacitive type, and may be a sandwich structure equipped with a flexible insulating film between two electrodes.

The two electrodes may be formed by flexible materials.

The capacity of the strain sensor may increase in direct proportion to the strain applied.

According to one example, the compensation circuit may comprise a circuit which can compensate for threshold voltage of a driving TFT, and may comprise each at least one storage capacitor, driving TFT and switching TFT.

FIG. 3, is a circuit diagram for describing the first compensation circuit suggested as one example in the compensation circuit according to one example of the present invention and a signal waveform diagram for driving the first compensation circuit. In FIG. 3, T1 is a driving TFT, and shows a double gate structure, and BG refers to Bottom Gate, and TG refers to Top Gate. T2 to T6 are switching TFTs, and have a single gate structure. C1 and C2 are storage capacitors, and Cs is a strain sensor, and is a capacitive type of deformation sensor.

Referring to FIG. 3, T1 is a driving TFT, and may have a double date structure. The circuit may comprise areas of a threshold voltage compensation unit and a luminance reduction compensation unit, and each area may comprise a TFT and a storage (capacitive) capacitor. The threshold voltage compensation unit may be composed of a storage capacitor (C1) for storing threshold voltage of T1, and switching TFTs (T2, T3) for initializing and adjusting each node voltage. The luminance reduction compensation unit, may have a structure in which a strain sensor (Cs) and a storage capacitor (C2) are connected in series, and nodes between them may be connected with a gate of T1. Then, switching TFTs (T4, T5) for initializing and adjusting each node voltage may be further comprised. In addition, an emission TFT which performs a role of blocking currents flowing through a light emitting device as T1 is turned on during compensation.

The operation principle of the circuit diagram illustrated in FIG. 3 is described in FIG. 4 and FIG. 7.

FIG. 4 to FIG. 7, sequentially show the principles of each step in which the first compensation circuit suggested as one example in the compensation circuit according to one example of the present invention is driven, and are circuit diagrams and signal waveform diagrams showing circuit driving of the node voltage initialization step, threshold voltage compensation step, data voltage application step, and light emitting device emission step, respectively.

The operation principle of the circuits illustrated in FIG. 3 will be described in detail with reference to each drawing of FIG. 4 and FIG. 7 as follows.

First, in the node voltage initialization step, voltage of all nodes is initialized. In this step, the storage voltage of C1 is $V_{ref}$ and the storage voltage of C2 and storage voltage of Cs are both 0V.

Then, in the threshold voltage compensation step, T6 is turned on and currents begins to be flowing through T1, and currents flow until the voltage stored in C1 becomes threshold voltage (Vth) of T1. Vth is applied to C1, and the storage voltage of C2 and Cs is still 0V.

Next, in the data voltage application step, as T3 is on, the source node of T1 becomes 0 V, and as T2 is off, the BG node voltage becomes Vth. Then, by capacitive coupling of C2 and Cs, the TG node voltage becomes Vdata(Cs/(Cs+ C2)), and as the Top Gate voltage of T1 increases, the threshold voltage of T1 becomes Vth-α(Vdata(Cs/(Cs+ C2))). For TFTs with the double gate structure, the threshold voltage may change depending on the top gate voltage change.

Then, in the light emitting emission step, as compensated currents flow through the circuit in the light emitting device, the light emitting device emits. Finally, the equation for calculating the currents flowing through the light emitting device is as follows, and the value below means that it is not affected by the threshold voltage.

$$I_{OLED} = k(V_{bgs} - (V_{th} \text{ of } T1))^2 =$$

$$k\left(V_{th} - \alpha \cdot V data\left(\frac{Cs}{Cs + C2}\right)\right)^2 = k\left(\alpha \cdot V data\left(\frac{Cs}{Cs + C2}\right)\right)^2$$

To summarize this, when deformation as e occurs in the display panel, the capacitance of the capacitive type of deformation sensor (Cs) increases by 1+ε times.

Accordingly, when the voltage stored in C2 changes by $$V_{data}\left(\frac{Cs(1+\epsilon)}{Cs(1+\epsilon)+C2}\right),$$

and the ε value is not very large, and is same as the value of Cs and C2, it may be close to $$V_{data}\left(\frac{Cs}{Cs+C2}\right)\sqrt{1+\epsilon}.$$

Therefore, the preceding OLED current equation is modified into $$k\left(\alpha.V_{data}\left(\frac{Cs}{Cs+C2}\right)\sqrt{1+\epsilon}\right)^2 =$$

$$k(1+\epsilon)\left(\alpha\cdot V_{data}\left(\frac{Cs}{Cs+C2}\right)\right)^2 I_{OLED}(1+\epsilon),$$

and the currents of the light emitting device increased by (1+ε) as targeted, so it can be confirmed that the brightness of the display is compensated.

FIG. 8, is a graph showing the result of the threshold voltage compensation simulation of the first compensation circuit suggested as one example in the compensation circuit according to one example of the present invention.

Through FIG. 8, as a result of the threshold voltage compensation simulation, it can be seen that the threshold voltage of the driving TFT is effectively compensated, even in a situation where 15% deformation occurs.

FIG. 9, is a graph showing the result of the luminance reduction compensation simulation according to display stretching of the first compensation circuit suggested as one example in the compensation circuit according to one example of the present invention.

Through FIG. 9, comparing (a) when there is no compensation and (b) after compensation as a result of the compensation simulation for brightness reduction due to stretching, it can be confirmed that the brightness reduction due to stretching has been effectively reduced.

According to one example, the compensation circuit may comprise a threshold voltage compensation unit comprising a circuit for compensating for changes in threshold voltage of a driving TFT; and a luminance reduction compensation unit comprising a circuit for compensating for reduction in luminance of the display.

According to one example, the driving TFT may be a double gate structure.

According to one example, the threshold voltage compensation unit may comprise a first storage capacitor for storing threshold voltage of the driving TFT; and a plurality of switching TFTs which are connected in series with the first storage capacitor and are for initializing and controlling voltage of each node.

According to one example, the luminance reduction compensation unit may comprise a structure in which the strain sensor is connected in series with one storage capacitor, and a node between the strain sensor and the storage capacitor may be connected with a gate of the driving TFT.

According to one example, the luminance reduction compensation unit may further comprise a plurality of switching TFTs for initializing and controlling voltage of each node.

Hereinafter, in the same manner as describing the circuit illustrated in FIG. 3 above, circuits and driving methods thereof suggested in other examples will be described with reference to FIG. 10 and below.

FIG. 10, is a circuit diagram for describing the second compensation circuit suggested as another example in the compensation circuit according to one example of the present invention, and a signal waveform diagram for driving the second compensation circuit. T1 is a driving TFT, and T2 to T5 are switching TFTs of a single gate, and C1 and C2 are storage capacitors, and Cs is a strain sensor.

FIG. 11 to FIG. 14, sequentially show the principles of each step in which the second compensation circuit suggested as another example in the compensation circuit according to one example of the present invention is driven, and are circuit diagrams and signal waveform diagrams showing circuit driving of the node voltage initialization step, threshold voltage compensation step, data voltage application step, and light emitting device emission step, respectively.

FIG. 15, a graph showing the result of the threshold voltage compensation simulation of the second compensation circuit suggested as one example in the compensation circuit according to one example of the present invention.

Through FIG. 15, as a result of the threshold voltage compensation simulation, it can be seen that the threshold voltage of the driving TFT is effectively compensated, even in a situation where 20% deformation occurs.

FIG. 16, is a graph showing the result of the luminance reduction compensation simulation according to display stretching of the second compensation circuit suggested as one example in the compensation circuit according to one example of the present invention.

Through FIG. 16, comparing (a) when there is no compensation and (b) after compensation as a result of the compensation simulation for brightness reduction due to stretching, it can be confirmed that the brightness reduction due to stretching has been effectively reduced.

FIG. 17, is a circuit diagram for describing the third compensation circuit suggested as other example in the compensation circuit according to one example of the present invention and a signal waveform diagram for driving the third compensation circuit.

In the same manner, T1 is a driving TFT, and T2 to T5 are switching TFTs, and Cst is a storage capacitor, and Cs refers to a strain sensor.

According to one example, the circuit of the threshold voltage compensation unit for compensating for changes in threshold voltage of the driving TFT and the circuit of the luminance reduction compensation unit for compensating for reduction of luminance of the display may be not separately divided and separated.

In a form such as the third compensation circuit, functions corresponding to the first compensation circuit and the second compensation circuit may be performed, without the threshold voltage compensation unit and the luminance reduction compensation unit being separated.

Then, in the form such as the compensation circuit of FIG. 3, the storage capacitor may perform threshold voltage storage and luminance reduction compensation simultaneously.

According to one example, the compensation circuit may comprise at least one emission TFT ((circuit 1: T6, circuit 3: T3, T5) which blocks current from flowing to the light emitting device during compensation of changes in luminance, and at least one of the emission TFTs may be connected between the driving TFT and the light emitting device.

FIG. 18 to FIG. 21, sequentially show the principles of each step in which the third compensation circuit suggested as other example in the compensation circuit according to one example of the present invention is driven, and are circuit diagrams and signal waveform diagrams showing circuit driving of the node voltage initialization step, threshold voltage compensation step, data voltage application step, and light emitting device emission step, respectively.

FIG. 22, a graph showing the result of the threshold voltage compensation simulation of the third compensation circuit suggested as one example in the compensation circuit according to one example of the present invention.

Through FIG. 22, as a result of the threshold voltage compensation simulation, it can be seen that the threshold voltage of the driving TFT is effectively compensated, even in a situation where 20% deformation occurs.

FIG. 23, is a graph showing the result of the luminance reduction compensation simulation according to display stretching of the third compensation circuit suggested as one example in the compensation circuit according to one example of the present invention.

Through FIG. 23, comparing (a) when there is no compensation and (b) after compensation as a result of the compensation simulation for brightness reduction due to stretching, it can be confirmed that the brightness reduction due to stretching has been effectively reduced.

In addition to the afore-mentioned features of the compensation circuit, in other aspect of the present invention, a method for compensating for luminance of a stretchable display using a compensation circuit is proposed.

The method for compensating for luminance of a stretchable display using a compensation circuit suggested according to another example of the present invention comprises; a node voltage initialization step, in which voltages applied to each node are initialized; a threshold voltage compensation step, in which threshold voltage of a driving TFT is stored in a storage capacitor of a threshold voltage compensation unit; a data voltage application step, in which data voltage is stored in the storage capacitor; and a light emitting device emission step, in which capacitive coupling occurs between a strain sensor and the storage capacitor and compensation for luminance reduction is performed and a light emitting device emits light, when stretching of a display occurs.

According to one example, the compensation for luminance reduction may be performed using the compensation circuit suggested according to one example of the present invention.

Another aspect of the present invention suggests a stretchable display device equipped with a compensation circuit.

The stretchable display comprising a luminance compensation circuit suggested according to other example of the present invention, which is a stretchable display comprising a luminance compensation circuit, comprises a compensation circuit which can compensate for changes in luminance occurring in a stretching process of the display by controlling current flowing through the light emitting device using a strain sensor, and the strain sensor is a capacitive type and is a sandwich structure equipped with a flexible insulating film between two electrodes, and the compensation circuit comprises a threshold voltage compensation unit comprising a circuit for compensating for changes in threshold voltage of a driving TFT; and a luminance reduction compensation unit comprising a circuit for compensating for reduction of luminance of the display.

The above description is illustratively describing the technical spirit of the present invention only, and those skilled in the art to which the present invention belongs can make various modification and variation in a range without departing from essential characteristics of the present invention. Therefore, the examples disclosed in the present invention are not intended to limit the technical spirit of the present invention, but are intended to describe it, and the scope of the technical spirit of the present invention is not limited. The scope of the present invention should be construed according to the claims below, and all the technical spirits within the equivalent range thereto should be construed as being included in the scope of the present invention.

The invention claimed is:

1. A stretchable display comprising:
a light emitting device;
a first capacitor;
a second capacitor;
a capacitive type strain sensor;
a driving transistor comprising a first electrode connected to a first electrode of the light emitting device;
a first transistor comprising a first electrode connected to a reference voltage line, a second electrode connected to a bottom gate of the driving transistor, and a gate connected to receive a first scan signal;
a second transistor comprising a first electrode connected to ground, a second electrode connected to a first electrode of the first capacitor and the first electrode of the light emitting device, and a gate connected to receive a second scan signal;
a third transistor comprising a first electrode connected to receive a data voltage, a second electrode connected to a first electrode of the capacitive type strain sensor, and a gate connected to receive the second scan signal;
a fourth transistor comprising a first electrode that is connected to a first electrode of the second capacitor and a second electrode of the capacitive type strain sensor, a second electrode connected to the second electrode of the second capacitor and the first electrode of the light emitting device, and a gate electrode connected to receive the first scan signal,
wherein the top gate of the driving transistor is directly connected to the second electrode of the capacitive type strain sensor, the first electrode of the second capacitor, and the first electrode of the fourth transistor,
wherein the bottom gate of the driving transistor is directly connected a second electrode of the first capacitor and the second electrode of the first transistor,
wherein the capacitive type strain sensor is configured to change capacitance and compensate for luminance changes when a strain is applied to the stretchable display.

2. The stretchable display of claim 1, further comprising:
a fifth transistor comprising a first electrode connected to receive a first power supply voltage, and a second electrode connected to a second electrode of the driving transistor, and a gate electrode connected to receive an emission signal.

3. The stretchable display of claim 1, wherein:
during a first period, the first transistor, the second transistor, the third transistor, and the fourth transistor are turned on.

4. The stretchable display of claim 3, wherein:

during the first period, all nodes are initialized.

5. The stretchable display of claim 1, wherein:

during a second period, the first transistor and the fourth transistor are turned on.

6. The stretchable display of claim 5, wherein:

during the second period, a threshold voltage is stored in the first capacitor.

7. The stretchable display of claim 1, wherein:

during a third period, the second transistor and the third transistor are turned on.

8. The stretchable display of claim 7, wherein:

during the third period, the bottom gate of the driving transistor receives a threshold voltage stored in the first capacitor, and the top gate of the driving transistor receives a voltage from the capacitive coupled second transistor and the capacitive type strain sensor.

9. The stretchable display of claim 1, wherein:

during a fourth period, the first transistor, the second transistor, the third transistor, and the fourth transistor are turned off.

10. The stretchable display of claim 9, wherein:

during the fourth period the light emitting device emits light.

11. The stretchable display of claim 1, wherein the light emitting device is a micro LED.

12. The stretchable display of claim 2, wherein:

during a first period, the first transistor, the second transistor, the third transistor, and the fourth transistor are turned on.

13. The stretchable display of claim 12, wherein:

during the first period, all nodes are initialized.

14. The stretchable display of claim 2, wherein:

during a second period, the first transistor, the fourth transistor, and the fifth transistor are turned on.

15. The stretchable display of claim 14, wherein:

during the second period, a threshold voltage is stored in the first capacitor.

16. The stretchable display of claim 2, wherein:

during a third period, the second transistor and the third transistor are turned on.

17. The stretchable display of claim 16, wherein:

during the third period, the bottom gate of the driving transistor receives a threshold voltage stored in the first capacitor, and the top gate of the driving transistor receives a voltage from the capacitive coupled second transistor and the capacitive type strain sensor.

18. The stretchable display of claim 2, wherein:

during a fourth period, the first transistor, the second transistor, the third transistor, and the fourth transistor are turned off, and the fifth transistor is turned on.

19. The stretchable display of claim 18, wherein:

during the fourth period the light emitting device emits light.

20. A stretchable display comprising:

a micro LED;

a first capacitor;

a second capacitor;

a capacitive type strain sensor;

a driving transistor comprising a first electrode connected to a first electrode of the micro LED;

a first transistor comprising a first electrode connected to a reference voltage line, a second electrode connected to a bottom gate of the driving transistor, and a gate connected to receive a first scan signal;

a second transistor comprising with a first electrode connected to ground, a second electrode connected to a first electrode of the first capacitor and the first electrode of the micro LED, and a gate connected to receive a second scan signal;

a third transistor comprising a first electrode connected to receive a data voltage, a second electrode connected to a first electrode of the capacitive type strain sensor, and a gate connected to receive the second scan signal;

a fourth transistor comprising a first electrode that is connected to a first electrode of the second capacitor and a second electrode of the capacitive type strain sensor, a second electrode connected to the second electrode of the second capacitor and the first electrode of the micro LED, and a gate electrode connected to receive the first scan signal, a fifth transistor comprising a first electrode connected to receive a first power supply voltage, and a second electrode connected to a second electrode of the driving transistor, and a gate electrode connected to receive an emission signal, wherein the top gate of the driving transistor is directly connected to the second electrode of the capacitive type strain sensor, the first electrode of the second capacitor, and the first electrode of the fourth transistor, wherein the bottom gate of the driving transistor is directly connected a second electrode of the first capacitor and the second electrode of the first transistor, wherein the capacitive type strain sensor is configured to change capacitance and compensate for luminance changes when a strain is applied to the stretchable display.

* * * * *